United States Patent
Lauterbach et al.

(10) Patent No.: US 7,870,091 B2
(45) Date of Patent: Jan. 11, 2011

(54) METHODS AND SYSTEMS FOR RECEIVING DATA, SELECTING A CONDITION TABLE, SELECTING A RULESET BASED ON THE CONDITION TABLE, AND DETERMINING AND APPLYING RULES TO DATA

(75) Inventors: Bernd G. Lauterbach, Walldorf (DE); Irena Kull, Yehud (IL); Richard Pellerin, Quebec (CA)

(73) Assignee: SAP AG, Walldorf (DE)

( * ) Notice: Subject to any disclaimer, the term of this patent is extended or adjusted under 35 U.S.C. 154(b) by 746 days.

(21) Appl. No.: 10/871,669

(22) Filed: Jun. 18, 2004

(65) Prior Publication Data
US 2005/0283486 A1 Dec. 22, 2005

(51) Int. Cl.
*G06F 7/20* (2006.01)
(52) U.S. Cl. ........................ 707/607; 705/333
(58) Field of Classification Search ............... 707/607; 705/333
See application file for complete search history.

(56) References Cited

U.S. PATENT DOCUMENTS

| | | | |
|---|---|---|---|
| 6,175,830 B1 * | 1/2001 | Maynard | 707/5 |
| 6,456,986 B1 * | 9/2002 | Boardman et al. | 705/400 |
| 6,922,687 B2 * | 7/2005 | Vernon | 707/1 |
| 6,924,828 B1 * | 8/2005 | Hirsch | 715/800 |
| 6,941,184 B2 * | 9/2005 | Ebert | 700/115 |
| 6,968,328 B1 * | 11/2005 | Kintzer et al. | 706/45 |
| 7,136,721 B2 | 11/2006 | Sano et al. | |
| 7,136,832 B2 * | 11/2006 | Li et al. | 705/34 |
| 7,151,453 B2 * | 12/2006 | Ebert | 340/572.1 |
| 7,168,619 B2 * | 1/2007 | Heusermann et al. | 235/385 |
| 7,196,622 B2 * | 3/2007 | Lambright et al. | 340/539.26 |
| 7,212,829 B1 | 5/2007 | Lau et al. | |
| 7,267,275 B2 | 9/2007 | Cox, Jr. et al. | |
| 7,428,519 B2 * | 9/2008 | Minsky et al. | 706/47 |
| 2002/0095306 A1 * | 7/2002 | Smith et al. | 705/1 |
| 2002/0111819 A1 * | 8/2002 | Li et al. | 705/1 |
| 2002/0143860 A1 * | 10/2002 | Catan | 709/203 |
| 2003/0144985 A1 * | 7/2003 | Ebert | 707/1 |

(Continued)

OTHER PUBLICATIONS

Ami Heitner et al., "Methods and Systems for Reconciling Data," U.S. Appl. No. 10/871,663, filed Jun. 18, 2004.

*Primary Examiner*—Hung Q Pham
*Assistant Examiner*—Hubert Cheung
(74) *Attorney, Agent, or Firm*—Finnegan, Henderson, Farabow, Garrett & Dunner, L.L.P.

(57) ABSTRACT

Systems and methods are provided for reconciling data. In one implementation, the systems and methods may receive first data corresponding to an expected state of at least one of a plurality of objects and create second data corresponding to an actual state of the at least one of the plurality of objects. In addition, the systems and methods may compare the first data to the second data to determine if the actual state corresponds to the expected state. In accordance with another implementation, systems and methods are provided for determining and applying rules to data. Such systems and methods may receive data comprising a root element and at least one leaf element, the root element having attributes and the attributes comprising characteristics, select a condition table based upon the characteristics, select a first ruleset based upon the selected condition table, and apply rules defined by the selected first ruleset to the data.

54 Claims, 8 Drawing Sheets

U.S. PATENT DOCUMENTS

| | | | |
|---|---|---|---|
| 2004/0024658 A1* | 2/2004 | Carbone et al. | 705/28 |
| 2004/0098272 A1* | 5/2004 | Kapsis et al. | 705/1 |
| 2004/0111410 A1* | 6/2004 | Burgoon et al. | 707/4 |
| 2004/0128321 A1* | 7/2004 | Hamer | 707/104.1 |
| 2004/0246130 A1* | 12/2004 | Lambright et al. | 340/539.26 |
| 2005/0004928 A1* | 1/2005 | Hamer et al. | 707/100 |
| 2005/0038764 A1* | 2/2005 | Minsky et al. | 706/47 |
| 2005/0144189 A1* | 6/2005 | Edwards et al. | 707/102 |
| 2005/0197844 A1* | 9/2005 | Ng et al. | 705/1 |
| 2005/0246342 A1* | 11/2005 | Vernon | 707/9 |
| 2010/0121770 A1* | 5/2010 | Johnson | 705/333 |

* cited by examiner

500

| Object Type | Vendor ID | Product ID | Serial Number |
|---|---|---|---|

METHODS AND SYSTEMS FOR RECEIVING DATA, SELECTING A CONDITION TABLE, SELECTING A RULESET BASED ON THE CONDITION TABLE, AND DETERMINING AND APPLYING RULES TO DATA

RELATED APPLICATION

The present application is related to U.S. patent application Ser No. 10/871,663, which was filed concurrently with the present application in the name of Ami HEITNER et al. and entitled "METHODS AND SYSTEMS FOR RECONCILING DATA," assigned to the assignee of the present application, is hereby incorporated by reference.

BACKGROUND OF THE INVENTION

I. Field of the Invention

The present invention generally relates to methods and systems for reconciling data. More particularly, the present invention relates to reconciling data and determining and applying rules to the data.

II. Background Information

Reconciling data and determining and applying rules to the data, for example, may be a process used in shipping and receiving objects. For example, this process may be used in packaging goods and sending the goods to a warehouse or retail store. In some situations, however, little attention may be paid to the receiver's expectations for the goods versus the sender's expectations for the goods as sent. For example, the sender may package the goods and send the package to the receiver with very little concern for how the goods are received. Thus, the conventional strategy is to ship goods from the sender to the receiver. This often causes problems because the conventional strategy, for example, may not efficiently reconcile the sender's and receiver's expectations.

In view of the foregoing, there is a need for methods and systems for reconciling data more optimally. Furthermore, there is a need for reconciling data and determining and applying rules to the data.

SUMMARY OF THE INVENTION

Consistent with embodiments of the present invention, systems and methods are disclosed for reconciling data and for determining and applying rules to the data.

In accordance with one embodiment, a method for reconciling data comprises receiving a first data corresponding to an expected state of at least one of a plurality of objects, creating a second data corresponding to an actual state of the at least one of the plurality of objects, and comparing the first data to the second data to determine if the actual state corresponds to the expected state.

According to another embodiment, a system for reconciling data comprises a memory storage for maintaining a database and a processing unit coupled to the memory storage, wherein the processing unit is operative to receive a first data corresponding to an expected state of at least one of a plurality of objects, create a second data corresponding to an actual state of the at least one of the plurality of objects, and compare the first data to the second data to determine if the actual state corresponds to the expected state.

In accordance with yet another embodiment, a computer-readable medium which stores a set of instructions which when executed performs a method for reconciling data, the method executed by the set of instructions comprises receiving a first data corresponding to an expected state of at least one of a plurality of objects, creating a second data corresponding to an actual state of the at least one of the plurality of objects, and comparing the first data to the second data to determine if the actual state corresponds to the expected state.

In accordance with yet another embodiment, a method for determining and applying rules to data comprises receiving a data comprising a root element and at least one leaf element, the root element having attributes, the attributes comprising characteristics, selecting a condition table based upon the characteristics, selecting a first ruleset based upon the selected condition table, and applying rules defined by the selected first ruleset to the data.

In accordance with yet another embodiment, a system for determining and applying rules to data comprises a memory storage for maintaining a database and a processing unit coupled to the memory storage, wherein the processing unit is operative to receive a data comprising a root element and at least one leaf element, the root element having attributes, the attributes comprising characteristics, select a condition table based upon the characteristics, select a first ruleset based upon the selected condition table, and apply rules defined by the selected first ruleset to the data.

In accordance with yet another embodiment, a computer-readable medium which stores a set of instructions which when executed performs a method for determining and applying rules to data, the method executed by the set of instructions comprises receiving a data comprising a root element and at least one leaf element, the root element having attributes, the attributes comprising characteristics, selecting a condition table based upon the characteristics, selecting a first ruleset based upon the selected condition table, and applying rules defined by the selected first ruleset to the data.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings:

FIG. 5 illustrates an exemplary electronic product code consistent with embodiments of the present invention;

DETAILED DESCRIPTION

Figure 1:
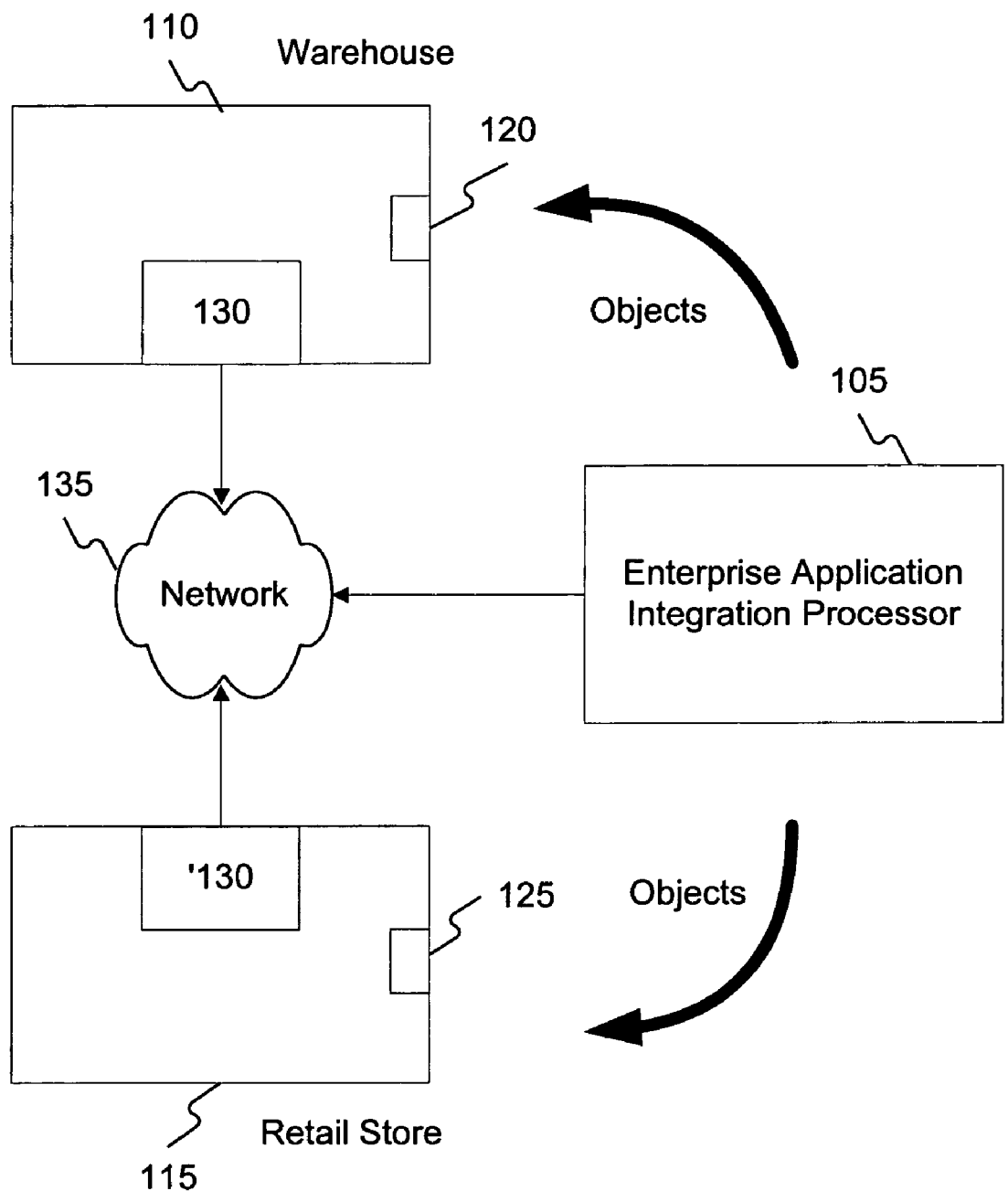
FIG. 1 is a block diagram of an exemplary object delivery system consistent with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

Systems and methods consistent with embodiments of the present invention may reconcile data. For example, FIG. 1 illustrates an exemplary object delivery system 100. As shown in FIG. 1, objects may be shipped from a central location, which may include an enterprise application integration processor 105, to a warehouse 110 or a retail store 115, for example. The objects may comprise any receivable element and, while warehouse 110 and retail store 115 are exemplary, the objects may be shipped to and received anywhere. When received at warehouse 110 or retail store 115, the objects may enter through gate 120 and 125 respectively. While the objects enter through the gates, indicia placed on the objects and/or on a container holding the objects may be read. For example, the indicia may comprise a bar code or a radio frequency identification (RFID) tag that may be read by the gates. Unlike a bar code, an RFID tag can be read through material such as cardboard and does not need to be read with a line-of-site laser.

After the indicia are read, data corresponding to the read indicia can be transmitted to a data processor such as data processors 130 and 130'. Among other things, the data transmitted to the data processors may indicate an actual state of the received objects as will be described below. Prior to the objects being received, however, processor 105 may transmit data to processors 130 and 130' indicating a state in which the objects are expected to be received. Once processors 130 and 130' have both the actual state data and the expected state data, these two data can be compared or reconciled to see if the two data agree or not. Processors 130 and 130' may transmit the results of this comparison back to processor 105.

For example, a pallet (the container in this example) with an electronic product code (EPC) tag may be loaded with 20 cases (the objects in this example), each case also having an EPC tag. The cases, for example, may contain goods such as diapers or paper towels. The pallet may be shipped to warehouse 110 where it may pass through gate 120. The tags may be read by an RFID reader that may create, for example, either a single data message containing all EPCs in a hierarchical relation (i.e. smart message) or multiple data messages containing a partial list of EPCs without hierarchy (i.e. a flat message). For the smart message, an object structure with a pallet element as the root element and 20 case elements as leave elements may be constructed. For the flat messages, independent pallet/case elements may be constructed. The aforementioned data messages may be sent to processor 130 and may contain one or more EPCs and user data associated to one or more EPCs. The user data may describe additional process characteristics, the object(s), and/or the scanning or physical environment related to the received individual EPC. The user data may comprise, but is not limited to, an expiration date, batch numbers, descriptions, or a list of actions applied to the object(s) or container(s).

Continuing with this example, prior to receiving the objects at gate 120, an enterprise managing warehouse 110 may be advised by a vendor who shipped the pallet. The vendor may advise the enterprise (over a network 135 using processor 105) that the shipment should arrive at a certain time at gate 120. The enterprise now may create an action corresponding to an expected state for the pallet and for each of the 20 cases. This action may reflect that each object may have to be scanned at a particular receiving gate reader which then may generate a "goods receiving" action for each object or container received. Upon receipt of the pallet, this action may bring each object and the pallet into the current state "received at warehouse," which corresponds to the expected state. The enterprise may then send a message to the vendor that the actual state and the received state have been reconciled. Furthermore, as discussed below, the objects may be received on multiple pallets and periodic updates may be made to the vendor regarding the shipment's receipt.

Moreover, systems and methods consistent with embodiments of the present invention may determine and apply rules to data. For example, the rules may be applied to data read and created regarding received objects and containers as described above. The data's hierarchy may comprise a top level element and may contain one or many dependent lower level elements in a tree representation. To each of these elements, rules may be applied to fulfill, for example, process evaluation, validation, communication, and status update activities. The rules for the current data hierarchy may be determined based on the characteristics of the top level element. Based on the top level element, a condition logic may be applied to find out which ruleset may be executed on the data hierarchy to fulfill, for example, business process steps needed for the particular situation.

Based on the characteristics of the top level element, the reader which created the object scan, the direction of the object passing the reader, and other flexibility definable criteria, for example, conditions may be setup using condition tables, which may be used to determine an appropriate ruleset. For one read, there may be one or many conditions evaluated to true, so that one or many rulesets may be executed in a sequence. The main rule determination may be applied to the top level element of the hierarchy, however, rules for the lower level tree elements may be carried out driven by activities that may trigger a new rule determination based on the currently handled data elements. This new rule processing may then include either the current data element or the current data element plus a lower level hierarchy data element.

After determining the ruleset to be used for processing a full or partial data hierarchy, the data and the ruleset may be processed by a rule processing software module. This software module may sequentially call each activity of the ruleset and hand over the data hierarchy to the activity. The activity may implement processing steps related to certain parts of the process. Examples for the process steps that may be implemented in activities may include:

Read data related to one or many objects of the object hierarchy from the database Update information related to one or more objects of the object hierarchy on the database (e.g. current state)

Validate, verify, compare, calculate information of the object hierarchy with other information Store information to be used in other activities of the current rule processing in the object context Communicate information out of the object hierarchy, previous activities results, or related information from the database to other systems Send status information to readers or device management systems Give feedback to users Prepare information for usage in key performance indicators The aforementioned activities may return an execution status that may be used by the rule processing software module to do exception handling. Based on a configuration, for example, the rule processing can be either: i) interrupted by an exception and call an exception activity that handles the result of the current finished activity; or ii) the rule processing can go into exception handling and afterwards cancel execution of further activities. Each ruleset may be defined, for example, by users to meet specific business requirements. Also, any kind of activity may be implemented and added into new or existing rulesets.

An embodiment consistent with the invention may comprise a system for reconciling data. The system may comprise a memory storage for maintaining a database and a processing unit coupled to the memory storage. The processing unit may be operative to receive a first data corresponding to an expected state of at least one of a plurality of objects. Furthermore, the processing unit may be operative to create a second data corresponding to an actual state of the at least one of the plurality of objects and to compare the first data to the second data to determine if the actual state corresponds to the expected state.

Another embodiment consistent with the invention may comprise a system for determining and applying rules to data. This system may comprise a memory storage for maintaining a database and a processing unit coupled to the memory storage. The processing unit may be operative to receive data comprising a root element and at least one leaf element, the root element having attributes, the attributes comprising characteristics. Furthermore, the processing unit may be operative to select a condition table based upon the characteristics, select a first ruleset based upon the selected condition table, and apply rules defined by the selected first ruleset to the data.

Consistent with an embodiment of the present invention, the aforementioned memory, processing unit, and other components may be implemented in a data processor, such as the exemplary data processor 130 of FIG. 1. Any suitable combination of hardware, software and/or firmware may be used to implement the memory, processing unit, and/or other components. By way of example, the memory, processing unit, and/or other components may be implemented with enterprise application integration processor 105 and/or data processor 130, in combination with the components for system 100. The aforementioned system and processors are exemplary and other systems and processors may comprise the aforementioned memory, processing unit, and/or other components, consistent with embodiments of the present invention.

Furthermore, the invention may be practiced in an electrical circuit comprising discrete electronic elements, packaged or integrated electronic chips containing logic gates, a circuit utilizing a microprocessor, or on a single chip containing electronic elements or microprocessors. The invention may also be practiced using other technologies capable of performing logical operations such as, for example, AND, OR, and NOT, including but not limited to mechanical, optical, fluidic, and quantum technologies. In addition, the invention may be practiced within a general purpose computer or in any other circuits or systems.

Figure 2:
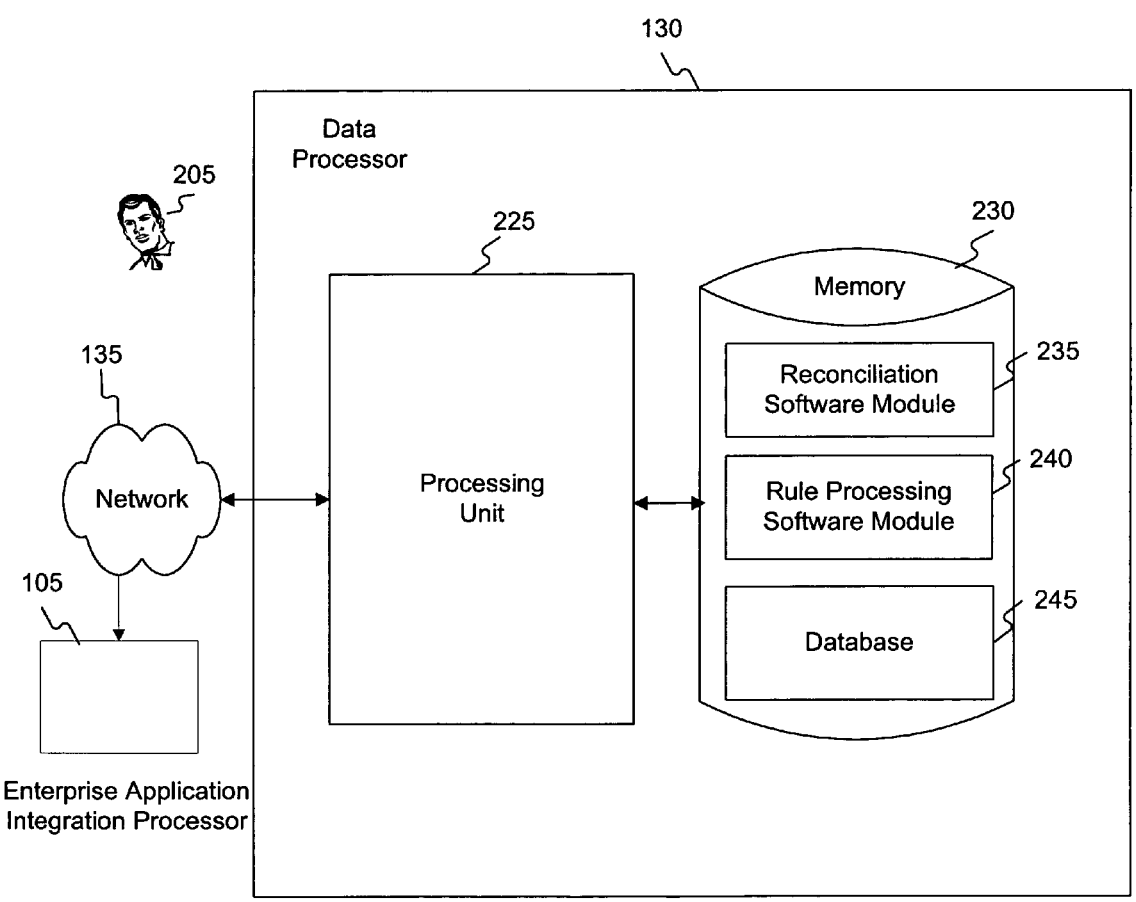
FIG. 2 is a block diagram of an exemplary data processor consistent with an embodiment of the present invention.

By way of a non-limiting example, FIG. 2 illustrates exemplary processor in which the features and principles of the present invention may be implemented. As illustrated in the block diagram of FIG. 2, system 100 may include enterprise application integration processor 105, data processor 130, a user 205, and network 135. User 205 may be an individual, for example, desiring to reconcile or apply rules to data using data processor 130. User 205 may also represent an organization, enterprise, or any other entity having such desires or similar uses.

Data processor 130 may include a processing unit 225 and a memory 230. Memory 230 may include a reconciliation software module 235, rule processing software module 240, and a database 245. Reconciliation software module 235, residing in memory 130, may be executed on processing unit 225 and may access database 245. For example, reconciliation software module 235 may be executed on processing unit 225 to perform processes consistent with embodiments of the invention, such as processes consistent with the methods described below with respect to FIG. 3 and FIG. 4. Similarly, rule processing software module 240, residing in memory 130, may be executed on processing unit 225 and may access database 245. For example, rule processing software module 240 may be executed on processing unit 225 to perform processes consistent with embodiments of the invention, such as processes consistent with the methods described below with respect to FIG. 6.

Enterprise application integration processor 105 or data processor 130 ("the processors") included in system 100 may be implemented using a personal computer, network computer, mainframe, or other similar microcomputer-based workstation. The processors may though comprise any type of computer operating environment, such as hand-held devices, multiprocessor systems, microprocessor-based or programmable sender electronic devices, minicomputers, mainframe computers, and the like. The processors may also be practiced in distributed computing environments where tasks are performed by remote processing devices. Furthermore, any of the processors may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, or a facsimile machine. The aforementioned systems and devices are exemplary and the processor may comprise other systems or devices.

Network 135 may comprise, for example, a local area network (LAN) or a wide area network (WAN). Such networking environments are commonplace in offices, enterprise-wide computer networks, intranets, and the Internet, and are known by those skilled in the art. When a LAN is used as network 135, a network interface located at any of the processors may be used to interconnect any of the processors. When network 135 is implemented in a WAN networking environment, such as the Internet, the processors may typically include an internal or external modem (not shown) or other means for establishing communications over the WAN. Further, in utilizing network 135, data sent over network 135 may be encrypted to insure data security by using known encryption/decryption techniques.

In addition to utilizing a wire line communications system as network 135, a wireless communications system, or a combination of wire line and wireless may be utilized as network 135 in order to, for example, exchange web pages via the Internet, exchange e-mails via the Internet, or for utilizing other communications channels. Wireless can be defined as radio transmission via the airwaves. However, it may be appreciated that various other communication techniques can be used to provide wireless transmission, including infrared line of sight, cellular, microwave, satellite, packet radio, and spread spectrum radio. The processors in the wireless environment can be any mobile terminal, such as the mobile terminals described above. Wireless data may include, but is not limited to, paging, text messaging, e-mail, Internet access and other specialized data applications specifically excluding or including voice transmission.

System 100 may also transmit data by methods and processes other than, or in combination with, network 135. These methods and processes may include, but are not limited to, transferring data via, diskette, CD ROM, facsimile, conventional mail, an interactive voice response system (IVR), or via voice over a publicly switched telephone network.

Figure 3:
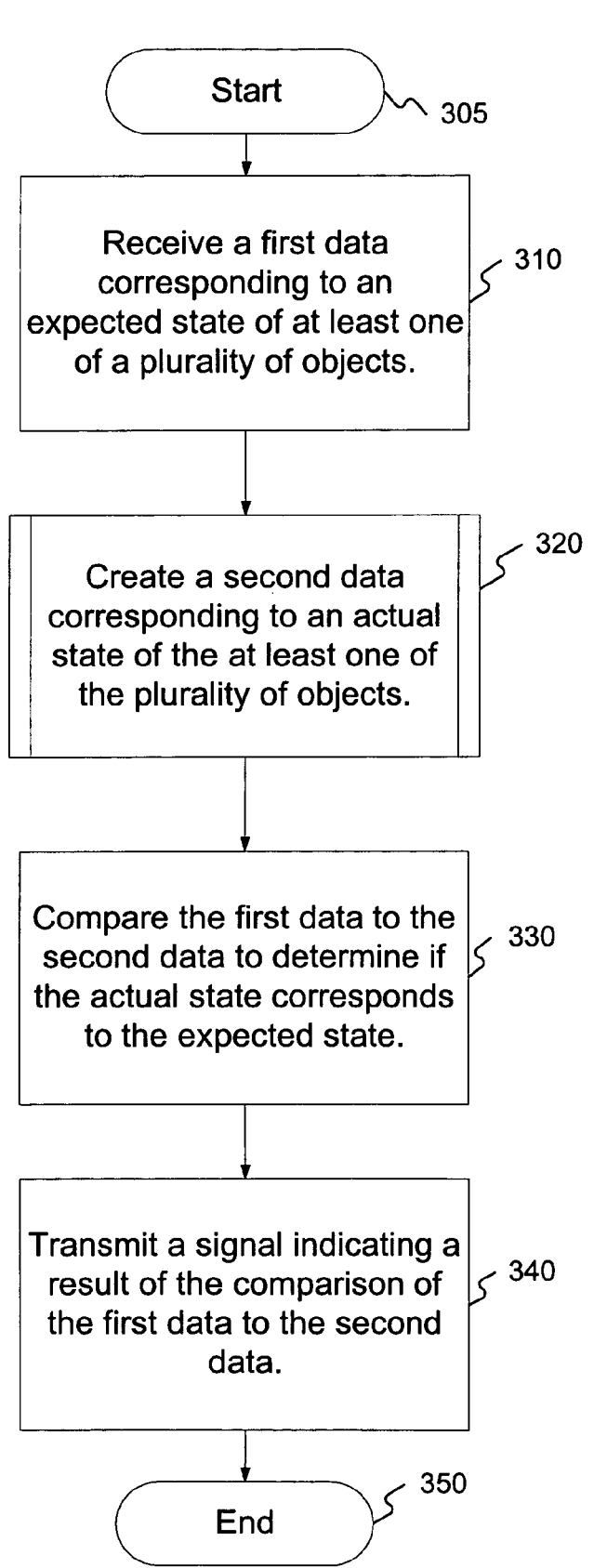
FIG. 3 is a flow chart of an exemplary method for reconciling data consistent with an embodiment of the present invention.

FIG. 3 is a flow chart setting forth the general stages involved in an exemplary method 300 consistent with the invention for reconciling data using system 100 of FIG. 1. Exemplary ways to implement the stages of exemplary method 300 will be described in greater detail below. Exemplary method 300 may begin at starting block 305 and proceed to stage 310 where processor 130 may receive a first data corresponding to an expected state of at least one of a plurality of objects. For example, the plurality of objects may be shipped form a vendor operating processor 105. Prior to shipment, however, the vendor may send, over network 135, the first data corresponding to the expected state of the plurality of objects shipped. The first data may be received at processor 130 by an enterprise receiving or purchasing the objects. The first data may be sent in a first hierarchical data structure comprising, for example, a first data root element corresponding to a container associated with the plurality of objects sent. Moreover, the first hierarchical data structure may also include a first data leaf element corresponding to at least one of the plurality of objects sent. The first hierarchical data structure may also include other leaf element corresponding to others of the plurality of objects sent. Moreover, the expected state may comprise a condition in which the container associated with the at least one of the plurality of objects and the at least one of the plurality of objects are expected to be in at a future time. The future time may comprise, for example, the time when the plurality of objects are received at warehouse 110.

From stage 310, where processor 130 receives the first data corresponding to the expected state of at least one of the plurality of objects, exemplary method 300 may advance to exemplary subroutine 320 where processor 130 may create a second data corresponding to an actual state of the at least one of the plurality of objects. Exemplary ways to implement the stages of exemplary subroutine 320 will be described in greater detail below with respect to FIG. 4.

Once processor 130 creates the second data corresponding to an actual state of the at least one of the plurality of objects in exemplary subroutine 320, exemplary method 300 may continue to stage 330 where processor 130 may compare the first data to the second data to determine if the actual state corresponds to the expected state. For example, processor 130 determines if the first data root element included in the first data has a corresponding second data root element in the second data. Furthermore, processor 130 may determine if all first data leaf elements included in the first data have corresponding second data leaf elements in the second data.

After processor 130 compares the first data to the second data to determine if the actual state corresponds to the expected state in stage 330, exemplary method 300 may proceed to stage 340 where processor 130 may transmit a signal indicating a result of the comparison of the first data to the second data. For example, processor may transmit the signal over network 135 to processor 105 indicating that the objects' actual received state and the objects' expected state are congruent and thus reconciled. After processor 130 transmits the signal indicating the result of the comparison of the first data to the second data in stage 340, exemplary method 300 may then end at stage 350.

Figure 4:
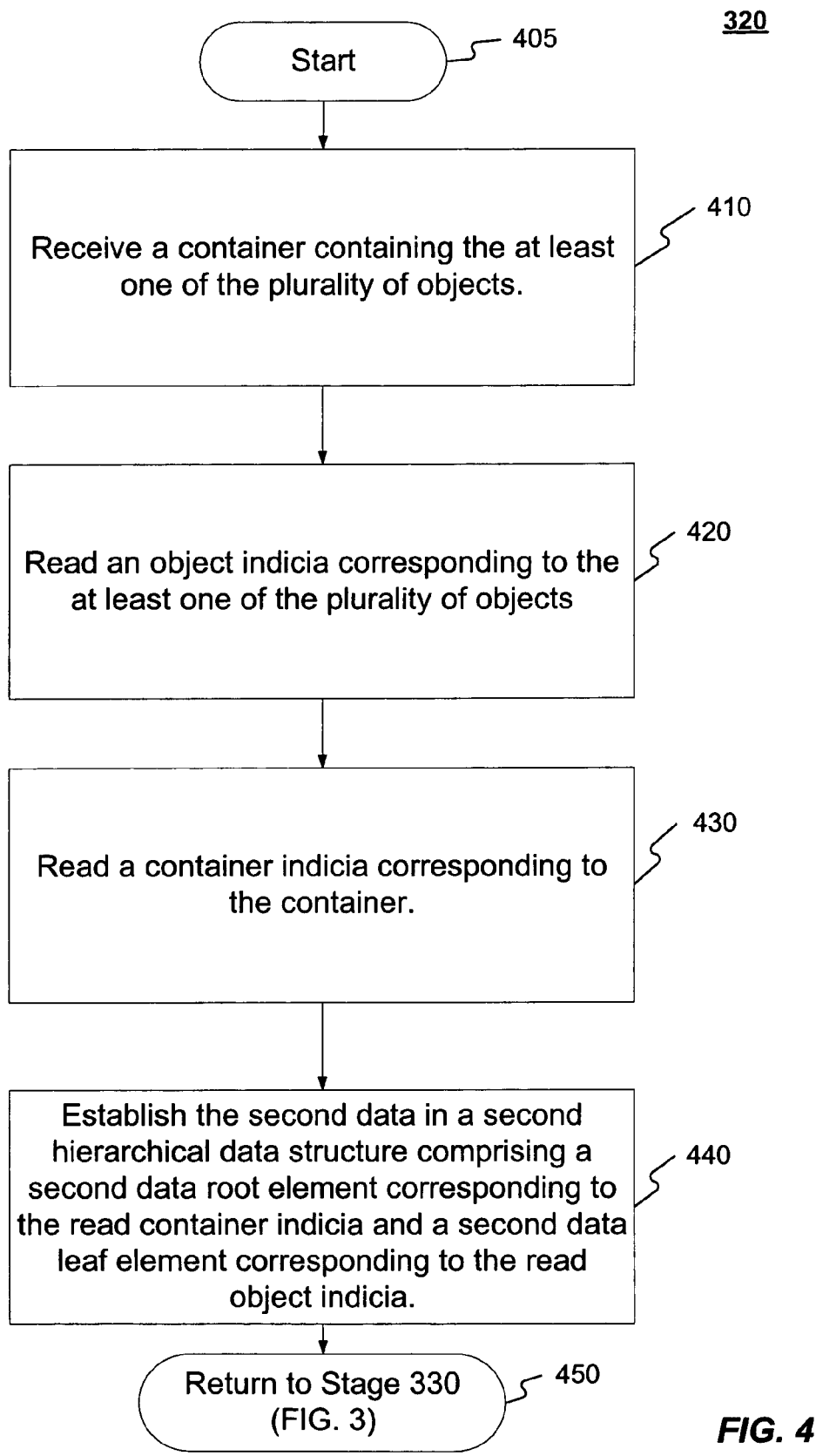
FIG. 4 is a flow chart of an exemplary subroutine used in the exemplary method of FIG. 3 for creating the second data consistent with an embodiment of the present invention.

FIG. 4 is a flow chart setting forth the general stages involved in an exemplary subroutine 320 consistent with the invention for creating the second data using system 100 of FIG. 1. Exemplary ways to implement the stages of exemplary subroutine 320 will be described in greater detail below. Exemplary subroutine 320 may begin at starting block 405 and proceed to stage 410 where warehouse 110 may receive a container containing the at least one of the plurality of objects. For example, the container may comprise a pallet, a forklift, a case, or a storage bin. The aforementioned are exemplary and the container may comprise other devices.

From stage 410, where warehouse 110 receives the container containing the at least one of the plurality of objects, exemplary subroutine 320 may advance to stage 420 where processor 130 may read an object indicia corresponding to the at least one of the plurality of objects. For example, objects received on the container may each include their own indicia. As the container passes through gate 120, a scanner or other machine may read the indicia on any or all of the plurality of objects. For example, the gate may receive a signal associated with a radio frequency identification (RFID) tag or may scan a bar code from the plurality of objects and pallet. The aforementioned are exemplary and the indicia may comprise any indicia and may be read by any device. Once gate 120 reads the object indicia, data obtained from this read may be sent to processor 130.

Moreover, reading the object indicia may also comprise reading an electronic product code (EPC). As illustrated in FIG. 5, reading the object indicia may also comprise receiving object attributes comprising at least one of an object type 505 (for example, pallet or case), a vendor identification number 510 identifying, for example, the vendor who shipped the objects, a product identification number 515 identifying, for example, the product shipped, and a serial number 520. Furthermore, the EPC may also include an expiration date of the objects, a batch number, a description of the objects or container, and a list of actions applied to the objects or container. Any or all of the above attributes may be included in the EPC. Moreover, the aforementioned attributes are exemplary and others may be used.

Once processor 130 reads the object indicia corresponding to the at least one of the plurality of objects in stage 420, exemplary subroutine 320 may continue to stage 430 where processor 130 may read a container indicia corresponding to the container. For example, the received container may also include its own indicia. As the container passes through gate 120, for example, the scanner or other machine may read the indicia on container. The container indicia may comprise any indicia as described above with respect to the object indicia and may be read in a similar manner.

The plurality of objects may also be shipped and received on more than one container. For example, a second container may be shipped and received including objects associated with a first container that was previously shipped and received. An indicia on the second container may be read and may include data linking the second container to other containers (the first container, for example) containing associated objects. Processor 130, for example, may send updates to processor 105 corresponding to the receipt of the first container and the second container used to ship associated objects. Furthermore, the updates may reflect a time difference between receiving the two containers. One aspect of an expected state, for example, may include receiving the multiple containers having associated objects within a specific time frame.

After processor 130 reads the container indicia corresponding to the container in stage 430, exemplary subroutine 320 may proceed to stage 440 where processor 130 may establish the second data in a second hierarchical data structure. The second hierarchical data structure may comprise a second data root element corresponding to the read container indicia and a second data leaf element corresponding to the read object indicia. After processor 130 establishes the second data in the second hierarchical data structure in stage 440, exemplary subroutine 320 may then return to stage 330 of exemplary method 300 as shown in FIG. 3.

Figure 6:
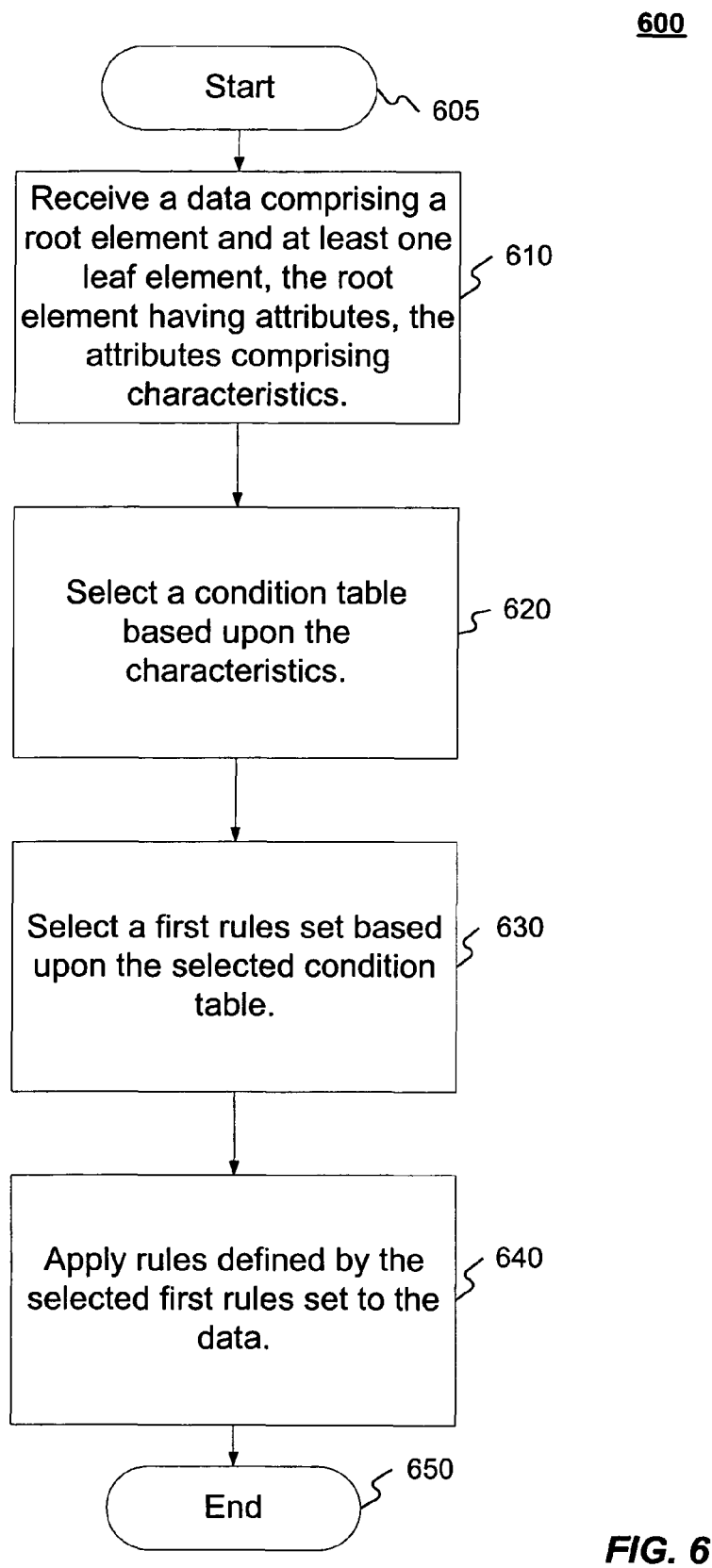
FIG. 6 is a flow chart of an exemplary method for determining and applying rules to data consistent with an embodiment of the present invention.

FIG. 6 is a flow chart setting forth the general stages involved in an exemplary method 600 consistent with the invention for determining and applying rules to data using system 100 of FIG. 1. Exemplary ways to implement the stages of exemplary method 600 will be described in greater detail below. Exemplary method 600 may begin at starting block 605 and proceed to stage 610 where processor 130 may receive a data comprising a root element and at least one leaf element. The root element may have attributes comprising characteristics. For example, the attributes may comprise characteristics comprising, for example, a direction (for example, in or out) the container was moving when an indicia associated with the container was read as it passed through gate 120. The attributes may also comprise a reader ID associated with a reader that read the indicia. For example, the reader ID may comprise an ID associated with gate 120. In addition, the attributes may also comprise an indication whether the reader (gate 120, for example) transformed flat data read into a hierarchical data structure.

Figure 7:
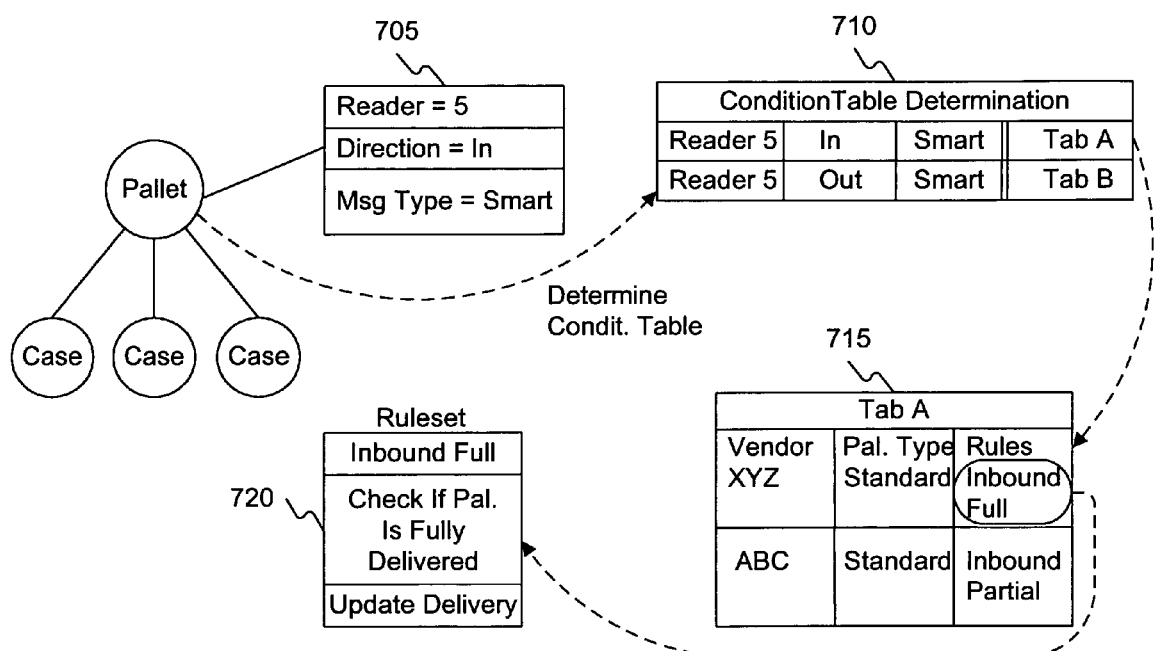
FIG. 7 illustrate an exemplary ruleset selection process consistent with embodiments of the present invention.

The received data's root element may also correspond to the container associated with at least one of a plurality of objects received. Furthermore, the received data's leaf elements may correspond to the plurality of objects received. As shown in FIG. 7, the characteristics may comprise characteristics 705. For example, the reader ID may be "5", the direction may be "in", and the message type may be "smart" (corresponding to a hierarchical data structure rather than a flat data structure).

From stage 610, where processor 130 receives the data, exemplary method 600 may advance to stage 620 where processor 130 may select a condition table based upon the characteristics. For example, as shown in condition table determination 710 of FIG. 7, if reader="5", direction="in", and message type="smart", condition table A 715 is chosen. However, if reader="5", direction="out", and message type="smart", condition table "B" would have been chosen. Consequently, given characteristics 705, condition table A 715 is chosen in this example.

Once processor 130 selects the condition table based on the characteristics in stage 620, exemplary method 600 may continue to stage 630 where processor 130 may select a first ruleset based upon the selected condition table. For example, other data, such as vendor name and pallet type obtained from the attributes, for example, may be used along with condition table A 715 to select the first ruleset. As shown in FIG. 7, for vendor name "XYZ" and pallet type "standard", the selected ruleset may comprise "inbound full" ruleset 720.

Figure 8:
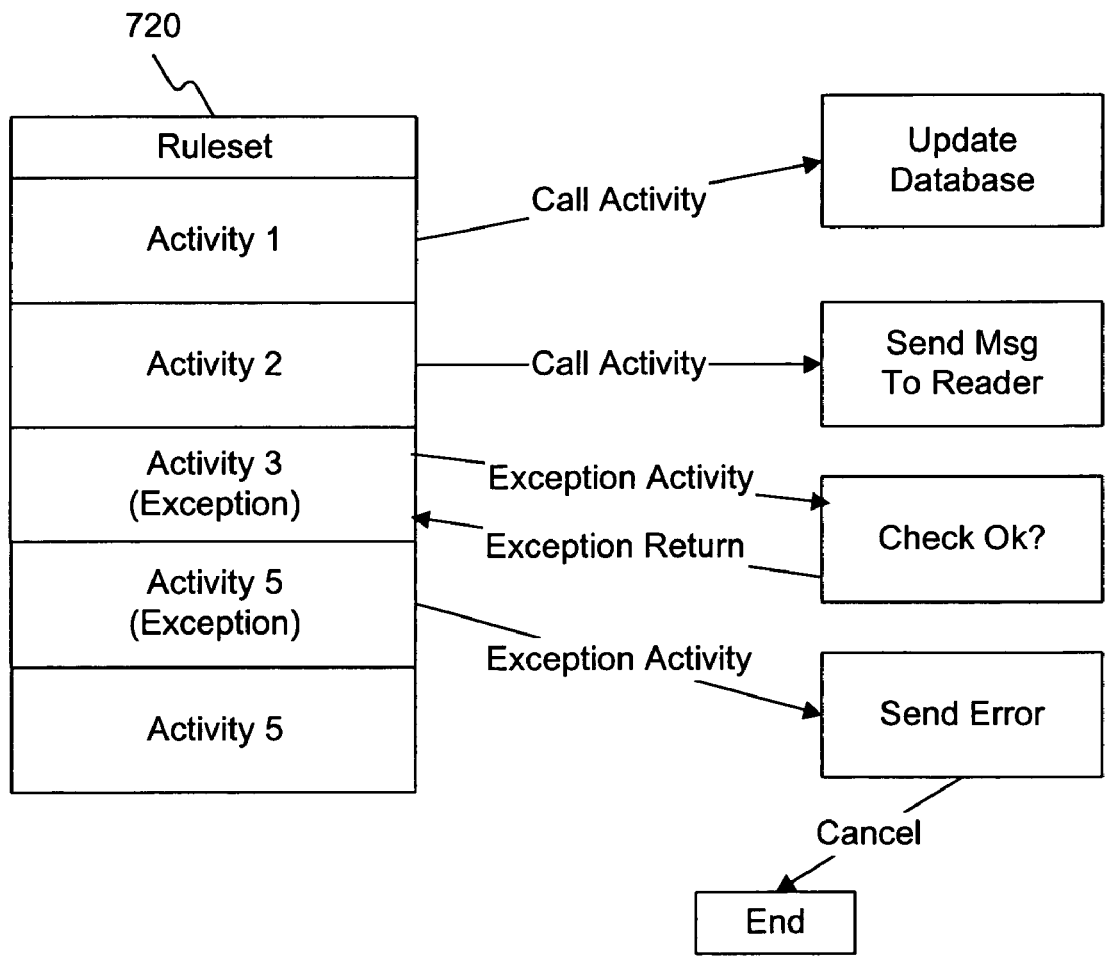
FIG. 8 illustrate an exemplary ruleset application process consistent with embodiments of the present invention.

After processor 130 selects the first ruleset based upon the selected condition table in stage 630, exemplary method 600 may proceed to stage 640 where processor 130 may apply rules defined by the selected first ruleset to the data. For example, rule processing software module 240 may be executed on processing unit 225 to carry out the activities of ruleset 720. As shown in FIG. 8, activity 1 may comprise updating database 245. Activity 2 of ruleset 720 may cause processing unit 225 to send a message to a reader. Next, activity 3 may cause processing unit to perform a check and return if the check is positive. Activity 4, however, may cause processing unit to perform a check that is not positive, but negative instead. In this case, an error may be sent and processing unit may stop executing ruleset 720. Consequently, because an error was returned by activity 4, activity 5 may not be executed. However, if activity 4 had been error free, activity 5 may be executed by processing unit 225.

Generally, rules may be applied to perform process evaluation, validation, communication, and status update. Exemplary activities included in ruleset may include: i) applying at least one of reading data related to one or many objects of the object hierarchy from a database; ii) updating information related to one or more objects of an object hierarchy on the database; iii) validating information of the object hierarchy with other information; iv) verifying information of the object hierarchy with other information; v) comparing information of the object hierarchy with other information; vi) calculating information of the object hierarchy with other information; vii) storing information to be used in other activities of a current rule processing in an object context; viii) communicating information out of the object hierarchy; ix) sending status information to readers or device management systems; x) giving feedback to users; and xi) preparing information for usage in key performance indicators.

While not illustrated above, more than one ruleset may be selected and applied to one data structure. For example, a second ruleset may be selected based upon a selected condition table. The rules from this second ruleset may be applied to the data. After processor 130 applies rules defined by the selected first ruleset (and/or second ruleset) to the data in stage 640, exemplary method 600 may then end at stage 650.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A method for determining and applying rules to data, the method comprising:

receiving, using a processor, an electronic signal that a shipment comprising a container holding an object has been received;

reading, using the processor, a container indicia associated with the received container, and an object indicia associated with the received object;

establishing, using the processor, a first hierarchical data structure associated with an actual state of the received shipment, the established first hierarchical data structure comprising a top-level element and a lower-level leaf element, the top-level element corresponding to the container indicia associated with the received container, and the lower-level leaf element corresponding to the object indicia associated with the received object, the top-level element and the lower-level leaf element having respective attributes, wherein the respective attributes comprise characteristics;

evaluating, using the processor, the characteristics of the top level element;

selecting, using the processor, a condition table based on at least the evaluated characteristics of the top-level element;

selecting, using the processor, a first ruleset from the selected condition table;

evaluating, using the processor, the characteristics of the lower-level leaf element;

selecting, using the processor, a second ruleset based on at least the selected first ruleset and the evaluated characteristics of the lower-level leaf element;

obtaining, using the processor, a second hierarchical data structure associated with an expected state of the received shipment, the obtained second hierarchical data structure comprising a top-level element corresponding to an expected container indicia, and a lower-level leaf element corresponding to an expected object indicia; and applying, using the processor, respective rules defined by the selected first ruleset and the selected second ruleset to the established first hierarchical data structure and the obtained second hierarchical data structure, wherein the applying the respective rules comprises:

determining whether the actual state of the received shipment corresponds to the expected state of the received shipment, wherein the determining comprises:

reconciling the container indicia associated with the received container with the expected container indicia by comparing the top-level element of the established first hierarchical data structure and the top-level element of the obtained second hierarchical data structure; and reconciling the object indicia associated with the received object with the expected object indicia by comparing the lower-level leaf element of the established first hierarchical data structure and the lower-level leaf element of the obtained second hierarchical data structure.

2. The method of claim 1, wherein the characteristics comprise at least one of a direction the received container was moving when the container indicia was read from the received container, a reader identification associated with a reader that read the container indicia, or an indication whether the reader transformed a flat data into the established first hierarchical data structure.

3. The method of claim 1, wherein the applying the respective rules further comprises calling an exception activity.

4. The method of claim 1, wherein the applying the respective rules further comprises at least one of reading data related to one or more objects of an object hierarchy from a database, updating information related to the one or more objects of the object hierarchy on the database, validating information of the object hierarchy with other information, verifying the information of the object hierarchy with the other information, calculating the information of the object hierarchy with the other information, storing information to be used in other activities of a current rule processing in an object context, communicating the information out of the object hierarchy, sending status information to readers or device management systems, giving feedback to users, or preparing information for usage in key performance indicators.

5. The method of claim 1, wherein the applying the respective rules further comprises:

applying a first rule that comprises an exception activity; and applying another rule.

6. The method of claim 1, wherein the applying the respective rules further comprises:

applying a first rule that comprises an exception activity; and canceling execution of other rules.

7. The method of claim 1, wherein the applying the respective rules further comprises applying rules defined by the selected first ruleset to data of the established first hierarchical data structure to fulfill at least one of process evaluation, validation, communication, or status update.

8. The method of claim 1, wherein the selecting the second ruleset comprises selecting the second ruleset based upon the selected condition table.

9. The method of claim 1, wherein the received container comprises at least one of a pallet, a forklift, a case, or a storage bin.

10. The method of claim 1, wherein the reading the object indicia associated with the received object comprises machine reading the object indicia associated with the received object.

11. The method of claim 10, wherein the machine reading the object indicia associated with the received object comprises at least one of receiving a signal associated with a radio frequency identification (RFID) tag or scanning a bar code.

12. The method of claim 1, wherein the reading the object indicia associated with the received object comprises reading an electronic product code.

13. The method of claim 1, wherein the reading the object indicia associated with the received object comprises receiving object attributes comprising at least one of an object type, a vendor identification number, a product identification number, a serial number, an expiration date, a batch number, a description, or a list of actions applied.

14. The method of claim 1, wherein the reading the container indicia associated with the received container comprises machine reading the container indicia associated with the received container.

15. The method of claim 14, wherein the machine reading the container indicia associated with the received container comprises at least one of receiving a signal associated with a radio frequency identification (RFID) tag or scanning a bar code.

16. The method of claim 1, wherein the reading the container indicia associated with the received container comprises reading an electronic product code.

17. The method of claim 1, wherein the reading the container indicia associated with the received container comprises receiving container attributes comprising at least one of a container type, a vendor identification number, a product identification number, a serial number, an expiration date, a batch number, a description, or a list of actions applied.

18. The method of claim 1, wherein the obtaining the second hierarchical data structure comprises:
  receiving data associated with the expected state of the received shipment, the received data comprising the expected container indicia and the expected object indicia; and
  processing the received data to generate the second hierarchical data structure.

19. A system for determining and applying rules to data, the system comprising:
  a memory storage for maintaining a database and a program; and
  a processing unit coupled to the memory storage, wherein the processing unit implements the program in order to:
    identify a shipment comprising a container holding an object has been received;
    read a container indicia associated with the received container, and an object indicia associated with the received object;
    establish a first hierarchical data structure associated with an actual state of the received shipment, the established first hierarchical data structure comprising a top-level element and a lower-level leaf element, the top-level element corresponding to the container indicia associated with the received container, and the lower-level leaf element corresponding to the object indicia associated with the received object, the top-level element and the lower-level leaf element having respective attributes, wherein the respective attributes comprise characteristics;
    evaluate the characteristics of the top level element;
    select a condition table based on at least the evaluated characteristics of the top-level element;
    select a first ruleset from the selected condition table;
    evaluate the characteristics of the lower-level leaf element;
    select a second ruleset based on at least the selected first ruleset and the evaluated characteristics of the lower-level leaf element;
    obtain a second hierarchical data structure associated with an expected state of the received shipment, the obtained second hierarchical data structure comprising a top-level element corresponding to an expected container indicia, and a lower-level leaf element corresponding to an expected object indicia; and
    apply respective rules defined by the selected first ruleset and the selected second ruleset to the established first hierarchical data structure and the obtained second hierarchical data structure, wherein the applying the respective rules comprises:
      determining whether the actual state of the received shipment corresponds to the expected state of the received shipment, wherein the determining comprises:
        reconciling the container indicia associated with the received container with the expected container indicia by comparing the top-level element of the established first hierarchical data structure and the top-level element of the obtained second hierarchical data structure; and
        reconciling the object indicia associated with the received object with the expected object indicia by comparing the lower-level leaf element of the established first hierarchical data structure and the lower-level leaf element of the obtained second hierarchical data structure.

20. The system of claim 19, wherein the characteristics comprise at least one of a direction the received container was moving when the container indicia was read from the received container, a reader identification associated with a reader that read the container indicia, or an indication whether the reader transformed a flat data into the established first hierarchical data structure.

21. The system of claim 19, wherein the applying the respective rules further comprises calling an exception activity.

22. The system of claim 19, wherein the applying the respective rules further comprises at least one of reading data related to one or more objects of an object hierarchy from the database, updating information related to the one or more objects of the object hierarchy on the database, validating information of the object hierarchy with other information, verifying the information of the object hierarchy with the other information, calculating the information of the object hierarchy with the other information, storing information to be used in other activities of a current rule processing in an object context, communicating the information out of the object hierarchy, sending status information to readers or device management systems, giving feedback to users, or preparing information for usage in key performance indicators.

23. The system of claim 19, wherein the applying the respective rules further comprises:
  applying a first rule that comprises an exception activity; and
  applying another rule.

24. The system of claim 19, wherein the applying the respective rules further comprises:
  applying a first rule that comprises an exception activity; and
  canceling execution of other rules.

25. The system of claim 19, wherein the applying the respective rules further comprises applying rules defined by the selected first ruleset to data of the established first hierarchical data structure to fulfill at least one of process evaluation, validation, communication, or status update.

26. The system of claim 19, wherein the selecting the second ruleset comprises selecting the second ruleset based upon the selected condition table.

27. The system of claim 19, wherein the received container comprises at least one of a pallet, a forklift, a case, or a storage bin.

28. The system of claim 19, wherein the reading the object indicia associated with the received object comprises machine reading the object indicia associated with the received object.

29. The system of claim 28, wherein the machine reading the object indicia associated with the received object comprises at least one of receiving a signal associated with a radio frequency identification (RFID) tag or scanning a bar code.

30. The system of claim 19, wherein the reading the object indicia associated with the received object comprises reading an electronic product code.

31. The system of claim 19, wherein the reading the object indicia associated with the received object comprises receiving object attributes comprising at least one of an object type, a vendor identification number, a product identification number, a serial number, an expiration date, a batch number, a description, or a list of actions applied.

32. The system of claim 19, wherein the reading the container indicia associated with the received container comprises machine reading the container indicia associated with the received container.

33. The system of claim 32, wherein the machine reading the container indicia associated with the received container comprises at least one of receiving a signal associated with a radio frequency identification (RFID) tag or scanning a bar code.

34. The system of claim 19, wherein the reading the container indicia associated with the received container comprises reading an electronic product code.

35. The system of claim 19, wherein the reading the container indicia associated with the received container comprises receiving container attributes comprising at least one of a container type, a vendor identification number, a product identification number, a serial number, an expiration date, a batch number, a description, or a list of actions applied.

36. The system of claim 19, wherein the processing unit implements the program in order to obtain the second hierarchical data structure further implements the program in order to:
receive data associated with the expected state of the received shipment, the received data comprising the expected container indicia and the expected object indicia; and
process the received data to generate the second hierarchical data structure.

37. A computer-readable medium which stores a set of instructions, which, when executed by a processor, performs a method for determining and applying rules to data, the method comprising steps, executed by the processor, of:
receiving an electronic signal that a shipment comprising a container holding an object has been received;
reading a container indicia associated with the received container, and an object indicia associated with the received object;
establishing a first hierarchical data structure associated with an actual state of the received shipment, the established first hierarchical data structure comprising a top-level element and a lower-level leaf element, the top-level element corresponding to the container indicia associated with the received container, and the lower-level leaf element corresponding to the object indicia associated with the received object, the top-level element and the lower-level leaf element having respective attributes, wherein the respective attributes comprise characteristics;
evaluating the characteristics of the top level element;
selecting a condition table based on at least the evaluated characteristics of the top-level element;
selecting a first ruleset from the selected condition table;
evaluating the characteristics of the lower-level leaf element;
selecting a second ruleset based on at least the selected first ruleset and the evaluated characteristics of the lower-level leaf element;
obtaining a second hierarchical data structure associated with an expected state of the received shipment, the obtained second hierarchical data structure comprising a top-level element corresponding to an expected container indicia, and a lower-level leaf element corresponding to an expected object indicia; and
applying respective rules defined by the selected first ruleset and the selected second ruleset to the established first hierarchical data structure and the obtained second hierarchical data structure, wherein the applying the respective rules comprises:
determining whether the actual state of the received shipment corresponds to the expected state of the received shipment, wherein the determining comprises:
reconciling the container indicia associated with the received container with the expected container indicia by comparing the top-level element of the established first hierarchical data structure and the top-level element of the obtained second hierarchical data structure; and
reconciling the object indicia associated with the received object with the expected object indicia by comparing the lower-level leaf element of the established first hierarchical data structure and the lower-level leaf element of the obtained second hierarchical data structure.

38. The computer-readable medium of claim 37, wherein the characteristics comprise at least one of a direction the received container was moving when the container indicia was read from the received container, a reader identification associated with a reader that read the container indicia, or an indication whether the reader transformed a flat data into the established first hierarchical data structure.

39. The computer-readable medium of claim 37, wherein the applying the respective rules further comprises calling an exception activity.

40. The computer-readable medium of claim 37, wherein the applying the respective rules further comprises at least one of reading data related to one or more objects of an object hierarchy from a database, updating information related to the one or more objects of the object hierarchy on the database, validating information of the object hierarchy with other information, verifying the information of the object hierarchy with the other information, calculating the information of the object hierarchy with the other information, storing information to be used in other activities of a current rule processing in an object context, communicating the information out of the object hierarchy, sending status information to readers or device management systems, giving feedback to users, or preparing information for usage in key performance indicators.

41. The computer-readable medium of claim 37, wherein the applying the respective rules further comprises:
applying a first rule that comprises an exception activity; and
applying another rule.

42. The computer-readable medium of claim 37, wherein the applying the respective rules further comprises:
applying a first rule that comprises an exception activity; and
canceling execution of other rules.

43. The computer-readable medium of claim 37, wherein the applying the respective rules further comprises applying rules defined by the selected first ruleset to data of the established first hierarchical data structure to fulfill at least one of process evaluation, validation, communication, or status update.

44. The computer-readable medium of claim 37, wherein the selecting the second ruleset comprises selecting the second ruleset based upon the selected condition table.

45. The computer-readable medium of claim 37, wherein the received container comprises at least one of a pallet, a forklift, a case, or a storage bin.

46. The computer-readable medium of claim 37, wherein the reading the object indicia associated with the received object comprises machine reading the object indicia associated with the received object.

47. The computer-readable medium of claim 46, wherein the machine reading the object indicia associated with the received object comprises at least one of receiving a signal associated with a radio frequency identification (RFID) tag or scanning a bar code.

48. The computer-readable medium of claim 37, wherein the reading the object indicia associated with the received object comprises reading an electronic product code.

49. The computer-readable medium of claim 37, wherein the reading the object indicia associated with the received object comprises receiving object attributes comprising at least one of an object type, a vendor identification number, a product identification number, a serial number, an expiration date, a batch number, a description, or a list of actions applied.

50. The computer-readable medium of claim 37, wherein the reading the container indicia associated with the received container comprises machine reading the container indicia associated with the received container.

51. The computer-readable medium of claim 50, wherein the machine reading the container indicia associated with the received container comprises at least one of receiving a signal associated with a radio frequency identification (RFID) tag or scanning a bar code.

52. The computer-readable medium of claim 37, wherein the reading the container indicia associated with the received container comprises reading an electronic product code.

53. The computer-readable medium of claim 37, wherein the reading the container indicia associated with the received container comprises receiving container attributes comprising at least one of a container type, a vendor identification number, a product identification number, a serial number, an expiration date, a batch number, a description, or a list of actions applied.

54. The computer-readable medium of claim 37, wherein the obtaining the second hierarchical data structure comprises:

receiving data associated with the expected state of the received shipment, the received data comprising the expected container indicia and the expected object indicia; and processing the received data to generate the second hierarchical data structure.

* * * * *